United States Patent
Guo et al.

(10) Patent No.: US 10,952,049 B2
(45) Date of Patent: Mar. 16, 2021

(54) USER EQUIPMENT AND NETWORK COMMUNICATION DEVICE IN COMMUNICATION SYSTEM AND WIRELESS COMMUNICATION METHOD

(71) Applicant: SONY CORPORATION, Tokyo (JP)

(72) Inventors: Xin Guo, Beijing (CN); Chen Sun, Beijing (CN); Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 197 days.

(21) Appl. No.: 15/520,942

(22) PCT Filed: Aug. 17, 2015

(86) PCT No.: PCT/CN2015/087235
§ 371 (c)(1),
(2) Date: Apr. 21, 2017

(87) PCT Pub. No.: WO2016/065975
PCT Pub. Date: May 6, 2016

(65) Prior Publication Data
US 2018/0020315 A1    Jan. 18, 2018

(30) Foreign Application Priority Data
Oct. 31, 2014 (CN) .......... 201410601836.7

(51) Int. Cl.
*H04L 12/24* (2006.01)
*H04L 29/06* (2006.01)
(Continued)

(52) U.S. Cl.
CPC .............. *H04W 4/50* (2018.02); *H04L 41/20* (2013.01); *H04L 63/083* (2013.01);
(Continued)

(58) Field of Classification Search
CPC ...... H04L 41/20; H04L 63/083; H04W 12/06; H04W 28/06; H04W 4/50; H04W 76/10; G06Q 20/108
(Continued)

(56) References Cited

U.S. PATENT DOCUMENTS 8,224,753 B2 * 7/2012 Atef ................. G06F 21/31
340/5.8
8,335,499 B1 * 12/2012 Zhao ................ H04W 4/00
455/418

(Continued)

FOREIGN PATENT DOCUMENTS

| CN | 102577264 A | 7/2012 |
| CN | 103096290 A | 5/2013 |

(Continued)

OTHER PUBLICATIONS

International Search Report dated Nov. 23, 2015, in PCT/CN2015/087235 filed Aug. 17, 2015.

*Primary Examiner* — Melvin C Marcelo
*Assistant Examiner* — Natali Pascual Peguero
(74) *Attorney, Agent, or Firm* — Xsensus LLP

(57) ABSTRACT

A user equipment and network communication device in a communication system and wireless communication method. The user equipment includes: an application type determination module, configured to obtain application type information contained in a type field of an application module in the user equipment to determine the application type of the application module, different application types corresponding to different networking methods; and a networking module, configured to establish a communication network with another user equipment based on the networking method corresponding to the application type of the application module, so as to use the application module.

15 Claims, 6 Drawing Sheets

(51) Int. Cl.
  *H04W 12/06* (2021.01)
  *H04W 4/00* (2018.01)
  *G06Q 20/10* (2012.01)
  *H04W 4/50* (2018.01)
  *H04W 28/06* (2009.01)
  *H04W 76/10* (2018.01)

(52) U.S. Cl.
  CPC ........... *H04W 12/06* (2013.01); *H04W 28/06* (2013.01); *H04W 76/10* (2018.02); *G06Q 20/108* (2013.01)

(58) Field of Classification Search
  USPC ........................................ 370/235, 254, 328
  See application file for complete search history.

(56) References Cited

U.S. PATENT DOCUMENTS

| | | | |
|---|---|---|---|
| 2010/0332667 A1 | 12/2010 | Menchaca et al. | |
| 2010/0333028 A1* | 12/2010 | Welsh | H04L 67/322 715/833 |
| 2012/0121089 A1* | 5/2012 | Morioka | H04L 9/0827 380/270 |
| 2013/0083653 A1 | 4/2013 | Jain et al. | |
| 2013/0083661 A1 | 4/2013 | Gupta et al. | |
| 2013/0083726 A1 | 4/2013 | Jain et al. | |
| 2013/0083783 A1 | 4/2013 | Gupta et al. | |
| 2013/0084885 A1 | 4/2013 | Jain et al. | |
| 2013/0084894 A1 | 4/2013 | Jain et al. | |
| 2013/0086653 A1 | 4/2013 | Gupta | |
| 2013/0132565 A1* | 5/2013 | Cetin | H04L 65/40 709/224 |
| 2013/0185586 A1* | 7/2013 | Vachharajani | H04L 45/44 714/2 |
| 2014/0071950 A1 | 3/2014 | Jang et al. | |
| 2014/0199969 A1* | 7/2014 | Johnsson | H04W 56/00 455/411 |
| 2014/0369201 A1 | 12/2014 | Gupta et al. | |
| 2015/0029845 A1 | 1/2015 | Jain et al. | |
| 2015/0036495 A1* | 2/2015 | Venkatachalam | H04W 4/70 370/235 |
| 2015/0117293 A1 | 4/2015 | Cho et al. | |

FOREIGN PATENT DOCUMENTS

| | | |
|---|---|---|
| CN | 104025475 A | 9/2014 |
| EP | 2 712 234 A2 | 3/2014 |
| WO | WO 2013/162162 A1 | 10/2013 |

\* cited by examiner

USER EQUIPMENT AND NETWORK COMMUNICATION DEVICE IN COMMUNICATION SYSTEM AND WIRELESS COMMUNICATION METHOD

FIELD

The present disclosure generally relates to the field of wireless communication. Specifically, the present disclosure relates to a user equipment and a network communication device in a communication system and a corresponding wireless communication method.

BACKGROUND

In recent years, the wireless communication technology makes considerable progress. Intelligent devices such as a smart phone are widely applied. An application in the intelligent device, such as an App, facilitates people's life and improves a working efficiency. However, a solution that network management is performed by the application is absent in the conventional technology, thereby resulting in a waste of radio resources and inconvenience of use.

For the above-described problem existing in the conventional technology, it is expected to provide a device and a method for managing a network according to features of an application, which can utilize radio resources sufficiently and perform networking using the best manner for the application.

SUMMARY

Brief summary of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

An object of the present disclosure is to provide a device and a method for selecting an appropriate networking mode based on a type of an application, for the above problems in the conventional technology.

In order to achieve the above object, according to an aspect of the present disclosure, a user equipment in a communication system is provided, which includes: an application type determining module configured to acquire application type information contained in a type filed of an application module in the user equipment to determine an application type of the application module, where different application types correspond to different networking modes; and a networking module configured to establish a communication network with another user equipment based on a networking mode corresponding to the application type of the application module, so as to use the application module.

According to another aspect of the present disclosure, a network communication device in a communication system is provided, which includes: an application module classifying module configured to analyze an application module, so as to perform classification in accordance with a networking mode adapted to the application module; and a field adding module configured to add a type field to the application module, the type field containing an application type of the application module representative of a classification result, where the application module is used by a user equipment to perform networking with another user equipment, and different application types correspond to different networking modes.

According to another aspect of the present disclosure, a wireless communication method is provided, which includes: acquiring, by an application type determining module of a user equipment in a communication system, application type information contained in a type field of an application module in the user equipment to determine an application type of the application module, where different application types correspond to different networking modes; and establishing, by a networking module of the user equipment, a communication network with another user equipment based on a networking mode corresponding to the application type of the application module, so as to use the application module.

According to another aspect of the present disclosure, a wireless communication method is provided, which includes: analyzing an application module by an application module classifying module of a network communication device in a communication system, so as to perform classification according to a networking mode adapted to the application module; and adding a type field to the application module by a field adding module of the network communication device, the type field containing an application type of the application module representative of a classification result, where the application module is used by a user equipment to perform networking with another user equipment, and different application types correspond to different networking modes.

In addition, according to another aspect of the present disclosure, a storage medium is further provided. The storage medium includes machine readable program codes, and when executed on an information processing apparatus, the program codes cause the information processing apparatus to perform the method according to the present disclosure described above.

In addition, according to another aspect of the present disclosure, a program product is further provided. The program product includes machine executable instructions, and when executed on an information processing apparatus, the instructions cause the information processing apparatus to perform the method according to the present disclosure described above.

BRIEF DESCRIPTION OF THE DRAWINGS

The above and other objects, features and advantages of the present disclosure can be understood easier with reference to the illustration of embodiments of the present disclosure in conjunction with the drawings in the following. Components in the drawings only illustrate principles of the present disclosure. In the drawings, the same or similar technical feature or component is indicated by the same or similar reference numeral. In the drawings.

DETAILED DESCRIPTION OF THE EMBODIMENTS

Figure 1:
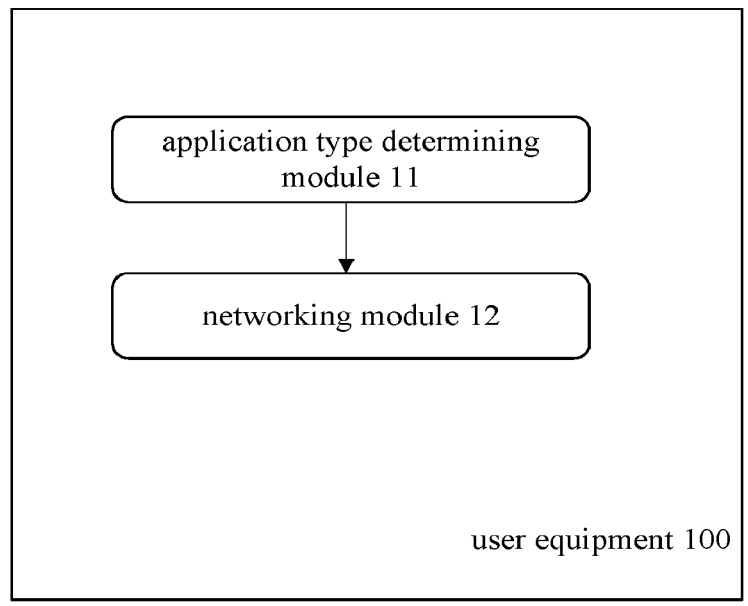
FIG. 1 shows a block diagram of a structure of a user equipment in a communication system according to an embodiment of the present disclosure.

Hereinafter exemplary embodiments of the present disclosure are described in detail in conjunction with the drawings. For clearness and conciseness, all the features of actual embodiments are not described in the description. However, it should be understood that, during a process of developing any one of the practical embodiment, many decisions specific to the embodiment need to be made, so as to achieve specific targets of the developer. For example, limitation conditions relevant to a system and a service should be met, and the limitation conditions vary with different embodiments. In addition, it should be known that although the developing work may be very complicated and time-consuming, the developing work is only a routine task for those skilled in the art benefitting from the content of the present disclosure.

Here, it should be noted that in order to avoid obscuring the present disclosure due to unnecessary details, the drawings only illustrate device structures and/or processing steps closely related to solutions of the present disclosure, and other details less related to the present disclosure are omitted. In addition, it should be further noted that elements and features described in one drawing or one embodiment of the present disclosure may be combined with elements and features illustrated in one or more other drawings or embodiments.

The basic concept of the present disclosure is: adding a type field to an application or an application module included in the application of a user equipment in a communication system, so as to indicate application type information of the application module; and selecting an appropriate networking mode based on the application type information. The type field is a field including the application type information demonstrating the application module. The application type includes but not limited to a type of a networking mode being based on third party auxiliary and a type of a networking mode being not based on the third party auxiliary. The application type information indicates an application type. It should be noted that, in the present disclosure, the application module is taken as example to represent an object to which a type field is added. In one aspect, the application module may be an application component having a specific function in application software, for example, a module for finding a user nearby in an instant communication application. In another aspect, it should be understood that, for example for an application with a single function, a type field may be added in the way described below by taking the whole application as a unit (i.e., regarding as the application module). The networking modes include: a networking mode in which communication data between user equipments is based on third party auxiliary transmission; and a networking mode in which communication data between user equipments is not based on the third party auxiliary transmission.

An example of the user equipment is user equipment, for example a mobile station. Specifically, the user equipment may be a portable intelligent apparatus such as a smart phone, a tablet computer and a pair of smart glasses, and an intelligent means of transportation such as an intelligent vehicle. An example of the third party is one of a base station, a network server in the Internet and a user node with a part of functions of the base station, or a combination thereof. The user equipment installed with the application module in the present disclosure can support multiple different types of networking modes, including a networking mode based on third party auxiliary such as the conventional cellular communication network, and a networking mode not based on the third party auxiliary such as an Ad hoc communication network in an IEEE802.11 standard and device to device (D2D) communication in an LTE-A standard. In the present disclosure, the type field is added to the specific application module to assist the user equipment to quickly determine a networking mode adapted to the application module.

Specifically, the networking mode in which communication data between user equipments is based on the third party auxiliary transmission is that data communication is performed between mobile stations via a base station for example, and is adapted to applications such as financial transaction and purchase payment. The networking mode in which communication data between user equipments is not based on the third party auxiliary transmission is D2D communication between mobile stations supporting the LTE-A standard for example, and is adapted to applications such as an on-line game, a shared video and a picture data.

The inventor of the present disclosure considers that a user is to be authenticated generally for a case with a high security requirement, for example an on-line payment after purchasing. Therefore, the type of communication data between user equipments is adapted to use the networking mode based on the third party auxiliary transmission.

In addition, the inventor of the present disclosure further considers that for a case relating to a large quantity of interaction data, for example an on-line game, more network resources will be occupied if forwarding via other nodes. Therefore, the type of communication data between user equipments is adapted to use the networking mode not based on the third party auxiliary transmission.

Actually, whether communication data between user equipments is adapted to be based on the third party auxiliary transmission is not always the same for an application, but may change with different application modules in the application. The security requirement refers to a requirement of the application module for security.

For example, in a case that both direct communication and conventional communication can be established between two users and if an application module in an application relates to only pictures and texts, for example introduction contents for a commodity are downloaded from other users and displayed to a user, the security requirement of the application module is low and the application module does not need to be based on the third party auxiliary transmission and is added a type field 1 (indicating the networking mode not based on the third party auxiliary). According to the present disclosure, the user equipment reads type field information when performing the application module, and determines to use, according to the type field, the networking mode not based on the third party auxiliary to transmit the pictures/texts. Another application module of the application relates to money, for example deciding to purchase a commodity and pay, in this case the application module has a high security requirement and is added with a type field 2 (indicating the networking mode based on the third party auxiliary). According to the present disclosure, the user equipment reads type field information when performing the application module, and determines to use, according to the type field, the networking mode in which communication data is transmitted based on the third party auxiliary transmission to transmit payment data such as a bank accountant and a password.

For example, an application module in an application relates to an on-line game and a game content includes many audios and videos. In this case the application module has a low security requirement but a high data quantity requirement, and thus is added with a type field 1. According to the present disclosure, the user equipment reads type field information when performing the application module, and determines to use, according to the type field, the networking mode not based on the third party auxiliary transmission. Another application module of the application relates to a game winner accepting gold coins from a game loser. In this case the application module has a high security requirement and thus is added with a type field 2, and generally needs authentication operations such as user login and password transmission. According to the present disclosure, the user equipment reads type field information when performing the application module, and determines, according to the type field, to transmit communication data based on the third party auxiliary.

In the conventional technology, whether the application transmits communication data based on the third party auxiliary is generally not related to the application module of the application, but is related to operations of a user. For example, when the user uses a smart phone, for any application, the user sets in a system to use wireless local area network transmission or a wireless telecommunication network provided by a mobile operator currently, or the user starts a Bluetooth communication module to establish a connection to certain users. In this case, the application module with a high security requirement may use a networking mode in which data is not transmitted based on the third party auxiliary and which has poor security, and the application module with a high data quantity requirement may use a networking mode in which data is transmitted based on the third party auxiliary and which has poor data transmission capability/a heavy network burden.

Therefore, with the technical solutions of the present disclosure, a type field is added to each application module included in the application of the user equipment in the communication system, and the type field indicates application type information of the application module. In this way, an appropriate networking mode may be selected according to the application type information. If the type field of the currently running application module indicates transmitting data based on the third party auxiliary or not, networking is performed according to the mode indicated by the type field.

The type field of the application module may be set based on at least one of the security requirement and the interaction data quantity requirement.

Specifically, different application types have different security requirements, and networking modes corresponding to respective application types adapt to security requirements thereof.

Alternatively, different application types have different interaction data quantity requirements, and networking modes corresponding to respective application types adapt to interaction data quantity requirements thereof.

Hereinafter a block diagram of a structure of a user equipment in a communication system according to an embodiment of the present disclosure is described with reference to FIG. 1.

FIG. 1 shows a block diagram of a structure of a user equipment in a communication system according to an embodiment of the present disclosure. As shown in FIG. 1, a user equipment 100 in a communication system according to the present disclosure includes: an application type determining module 11 configured to acquire application type information contained in a type field of an application module in the user equipment to determine an application type of the application module, where different application types correspond to different networking modes; and a networking module 12 configured to establish a communication network with another user equipment based on a networking mode corresponding to the application type of the application module, so as to use the application module.

The user equipment in the communication system includes but not limited to: user equipment for example a car, a mobile phone, a tablet computer and a smart wearable device, and a main processing module in respective user equipment for example a chip.

The application type of the application module in the user equipment may be determined in advance and written in the type field. The operation is performed by a network communication device, which is described in the following.

The application type determining module 11 of the user equipment 100 acquires the application type information from the type field of the application module to determine an application type of the application module.

The networking module 12 establishes, according to a determination result of the application type determining module 11, a communication network with another user equipment in a networking mode corresponding to the application type of the application module, so as to use the application module.

In an embodiment, the user equipment 100 further includes a registering module configured to register with a service system of the application module and obtain a unique main identity of a user from the service system.

The main identity may be information such as a user ID.

In the present disclosure, the main identity is significant identity information of the user. In addition to being used to distinguish from other users, the main identity is related to features of the user, for example an actual identity, a geographical position, a preference and a level of the user. Therefore, in the present disclosure, the main identity is applied to an application module with a high security requirement.

In an embodiment, the user equipment 100 further includes a temporary identity module configured to generate one or more user temporary identities. The user temporary identity is mainly used to distinguish from other users, and may be not related to features of the user, so as to be applied to an application module with a low security requirement.

The temporary identity is an identity which is temporary relative to the main identity. In a scene with a low security requirement, the temporary identity may be used to substitute for the main identity. In this way, at least a part of information (including but not limited to a main identity name, and historical statistical information of the user such as a level in a game and preference information) of the main identity may be hidden, to avoid information theft and snooping of a user privacy. The temporary identity may exist in a life cycle of a temporary network, and a specific temporary identity may be used to shield the user using the temporary identity from being snooped by other users in a certain temporary network. For example, other users can not determine a geographical position or preference/level of the user according the temporary identity of the user. According to an example of the present disclosure, each temporary identity generated by the temporary identity module is only used in a certain temporary network. For example, the temporary identity module generates, in response to a networking operation of the networking module 12, a temporary identity applied to the network; and generates other temporary identities in other networking.

In constructing a temporary network, the user may select using the temporary identity, to avoid that other parties which may be harmful acquire and track personal privacy information of the user. However, it is not necessary to use the temporary identity. In the present disclosure, an opportunity is provided for the user to select using the main identity or the temporary identity. If the user selects using the temporary identity, the temporary identity may exist in a life cycle of the temporary network; and before the temporary network ends, the user may select deleting the temporary identity or reserving the temporary identity for later networking. If the user selects reserving the temporary identity, the user is prompted whether to load the existing temporary identity when the user generates a service request, before the later networking. In an embodiment, the user equipment 100 further includes an authenticating module configured to submit information containing an identity of the user to the service system of the application module, to obtain a unique main identity having an identity authenticating identification.

In the present disclosure, it is considered that the authenticated main identity has high security, thereby applying to an application module with a high security requirement.

In an embodiment, the networking module 12, in the networking mode in which communication data between user equipments is not based on the third party auxiliary transmission, generates a service request including an application name and position information of the user equipment; on one or a group of preset channels, intercepts networking broadcast signaling; in a case where no networking broadcast signaling is intercepted, selects an idle channel to transmit networking broadcast signaling including the service request; in a case where networking broadcast signaling is intercepted, compares a service request included in the intercepted networking broadcast signaling with the generated service request; in a case where the comparison indicates that the service requests are consistent, transmits networking response signaling; in a case where the comparison indicates that the service requests are inconsistent, selects an idle channel to transmit networking broadcast signaling including the service request; and continues to intercept, in the absence of networking broadcast signaling including a consistent service request and in the absence of an idle channel, until one of the networking broadcast signaling and the idle channel is found.

In an embodiment, the networking module 12, in the networking mode in which communication data between user equipments is based on the third party auxiliary transmission, generates a service request including position information of the user equipment; transmits request signaling including the service request to the third party; receives acknowledge signaling of the third party on the request signaling; and communicates, via the third party, with another user equipment transmitting the acknowledge signaling.

Hereinafter a block diagram of a structure of a network communication device in a communication system according to an embodiment of the present disclosure is described with reference to FIG. 2.

Figure 2:
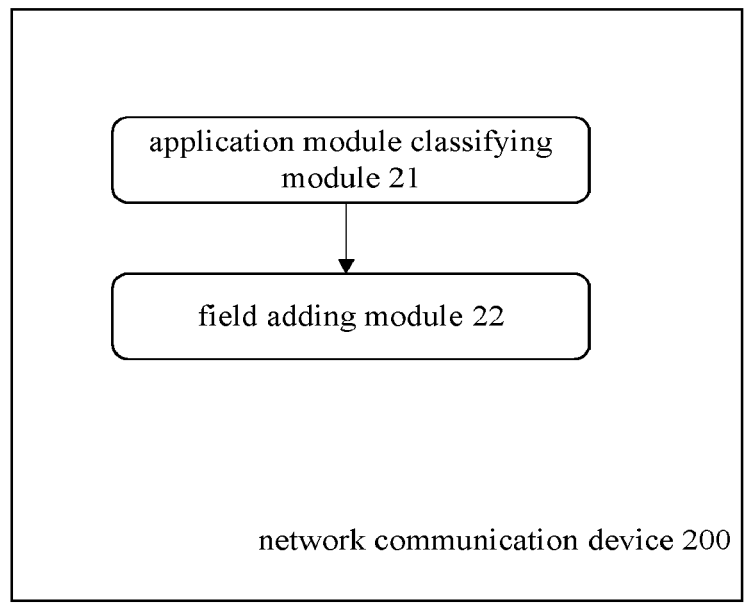
FIG. 2 shows a block diagram of a structure of a network communication device in a communication system according to an embodiment of the present disclosure.

FIG. 2 shows a block diagram of a structure of a network communication device in a communication system according to an embodiment of the present disclosure. As shown in FIG. 2, a network communication device 200 in the communication system according to the present disclosure includes: an application module classifying module 21 configured to analyze an application module, so as to perform classification in accordance with a networking mode adapted to the application module; and a field adding module 22 configured to add a type field to the application module, the type field containing an application type of the application module representative of a classification result, where the application module is used by a user equipment to perform networking with another user equipment, and different application types correspond to different networking modes.

The network communication device in the communication system includes but not limited to: a server, a base station embedded with functions of the server, and a main processing module in the server for example a chip.

The application module classifying module 21 analyzes the application module, so as to perform classification in accordance with a networking mode adapted to the application module. As described above, the networking mode adapted to the application module is determined based on the security requirement and the interaction data quantity requirement of the application module and so on.

In an embodiment, the application module classifying module 21 is configured to analyze a security requirement of the application module, and determine, based on the security requirement, a networking mode adapted to the application module, so as to perform the classification.

As a preferred way, whether the security requirement is high or low may be determined by whether user authentication is needed. If user authentication is needed, the security requirement is high; and if the user authentication is not needed, the security requirement is low.

In an embodiment, the application module classifying module 21 is configured to analyze an interaction data quantity requirement of the application module, and determine, based on the interaction data quantity requirement, a networking mode adapted to the application module, so as to perform the classification.

As a preferred way, whether the interaction data quantity requirement is high or low may be determined by a data type and a data quantity for the interaction. For example, if the interaction data is multimedia information and the data quantity may be above 100 M, the interaction data quantity requirement is high. If the interaction data is literal information and the number of words in each piece of literal information is limited, the interaction data quantity requirement is low.

The field adding module 22 adds a type field to the application module in accordance with an analysis result of the application module classifying module 21, so as to facilitate the user equipment to select an appropriate networking mode according to a type of the application module.

The network communication device 200 may include a user registering unit configured to accept registration of the user. The user obtains a unique main identity in a system by user registering. The temporary identity mentioned above may not be registered.

Figure 5:
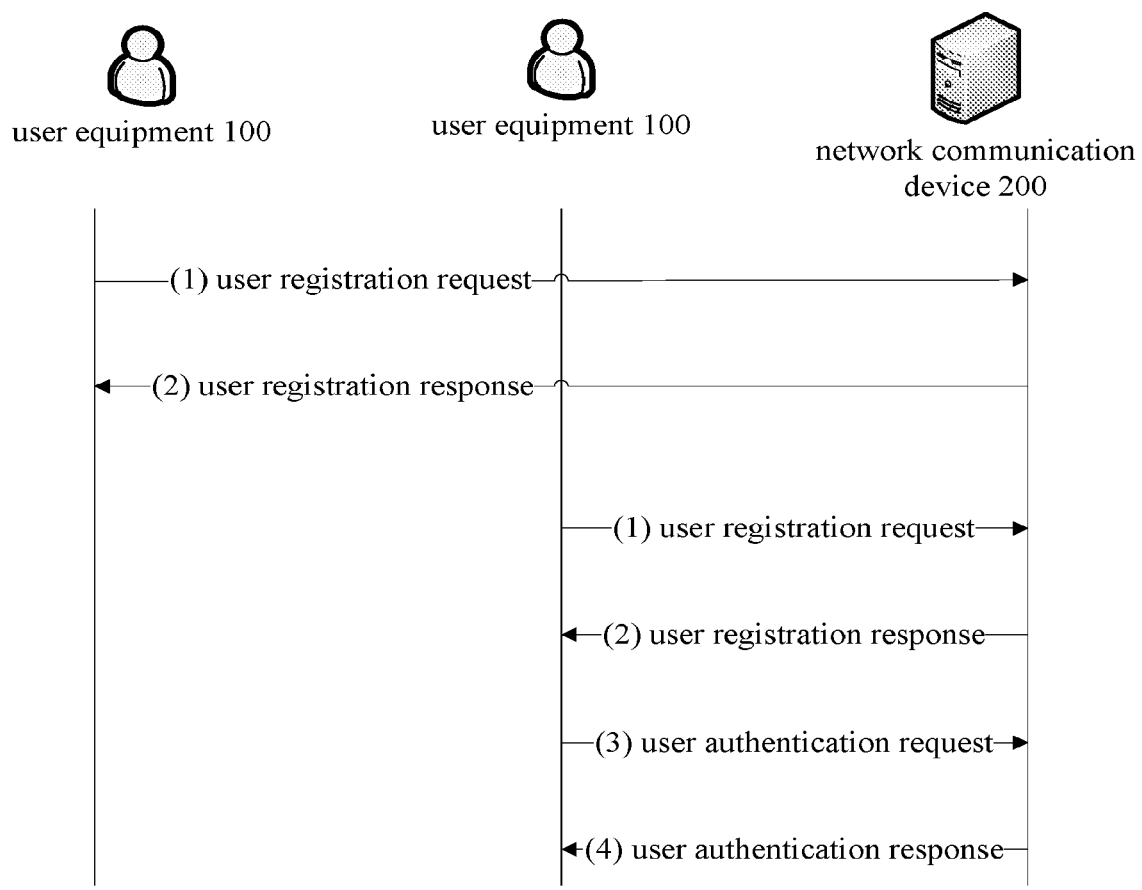
FIG. 5 shows a flowchart of registering and authenticating.

As shown in a left side of FIG. 5, a flow of registering includes: first, the user equipment 100 transmits user registering request signaling to the network communication device 200. The user registering request signaling may include basic information of the user, for example a user name and a password. Then, a user registering unit of the network communication device 200 registers according to the request signaling of the user, to assign a unique main identity for a user of the user equipment 100. Optionally, basic services and a user space are also assigned. At this phase, the user only registers and is not authenticated, therefore in some examples of the present disclosure, the basic service and the user space are basic configurations, for example a list including only applications with a low security requirement. Finally, the user registering unit of the network communication device 200 transmits user registering response signaling to the user equipment 100, to notify the user that whether the registration is successful. Optionally, the user registering response signaling includes a list of basic services and a link to the user space and so on.

Based on the registration, the user may obtain a service with a higher security level requirement through user authentication, for example a bailout service which may be related to an off-line transaction. In an embodiment, the network communication device 200 further includes a user authenticating unit configured to authenticate a user based on identity information of the user, where the network communication device provides an application module with a high security requirement to the authenticated user. The identity information of the user includes but not limited to real name identity information of the user, for example a name and an ID card number.

The user authentication flow is necessarily after the user registers successfully and becomes a user of the system. As shown in a right side of FIG. 5, the user authentication flow includes: first, a registration user transmits user authentication request signaling to the network communication device 200 as an authentication request. The user authentication request signaling includes but not limited to: real name identity information of the user, for example a name and an ID card number. Then, a user authentication unit of the network communication device 200 performs authentication according to the user authentication request signaling, to assign a system identity authentication identification and a service with a high security level to a user of the user equipment 100. Finally, the user authentication unit of the network communication device 200 transmits user authentication response signaling to the user equipment 100, to indicate whether the authentication is successful.

In an embodiment, the network communication device 200 further includes an auxiliary communication unit. In a networking mode in which communication data between user equipments is based on third party auxiliary transmission, the auxiliary communication unit is configured to: receive request signaling including a service request containing position information of a first user equipment which is transmitted by the first user equipment; broadcast broadcast signaling including the service request; receive acknowledge signaling of a second user equipment on the broadcast signaling; transmit the acknowledge signaling to the first user equipment; and coordinate communication between the first user equipment and the second user equipment.

Hereinafter flows of a wireless communication method according to an embodiment of the present disclosure are described with reference to FIG. 3.

Figure 3:
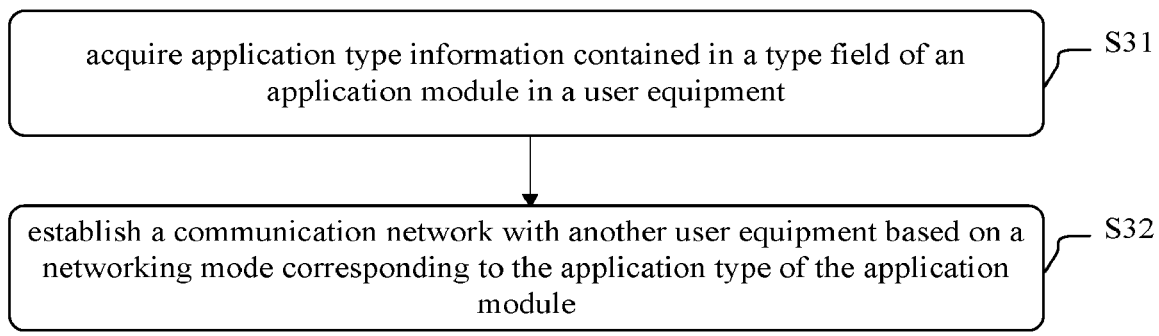
FIG. 3 shows a flowchart of a wireless communication method according to an embodiment of the present disclosure.

FIG. 3 shows a flowchart of a wireless communication method according to an embodiment of the present disclosure. As shown in FIG. 3, the wireless communication method according to the present disclosure includes the following steps: acquiring, by an application type determining module of a user equipment in a communication system, application type information contained in a type field of an application module in the user equipment, to determine an application type of the application module, where different application types correspond to different networking modes (step S31); and establishing, by a networking module of the user equipment, a communication network with another user equipment based on a networking mode corresponding to the application type of the application module, so as to use the application module (step S32).

Figure 4:
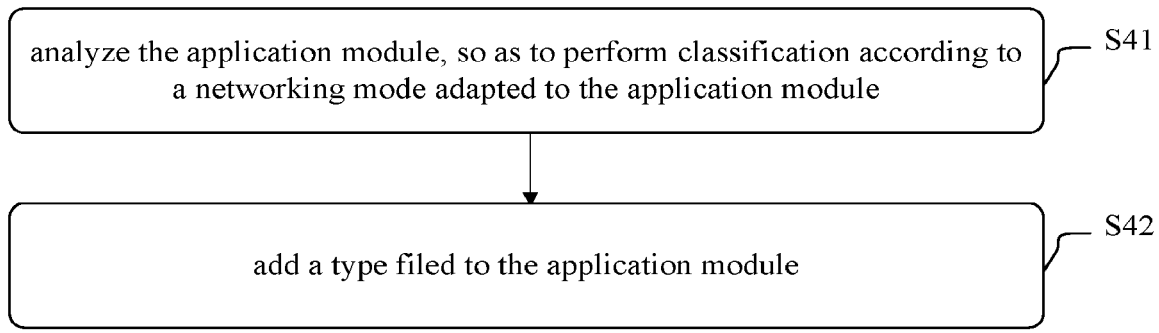
FIG. 4 shows a flowchart of a wireless communication method according to an embodiment of the present disclosure.

FIG. 4 shows a flowchart of a wireless communication method according to an embodiment of the present disclosure. As shown in FIG. 4, the wireless communication method according to the present disclosure includes the following steps: analyzing an application module by an application module classifying module of a network communication device in a communication system, so as to perform classification in accordance with a networking mode adapted to the application module (step S41); and adding a type field to the application module by a field adding module of the network communication device, the type field containing an application type of the application module representative of a classification result (step S42), where the application module is used by a user equipment to perform networking with another user equipment, and different application types correspond to different networking modes.

Since processing in respective steps included in the wireless communication method according to the present disclosure is respectively similar to processing in respective components and units of the user equipment and the network communication device in the communication system described above, detailed description of the processing is omitted here for briefness.

Hereinafter, related flows of two types of type field information are illustrated by examples.

(1) A networking mode not based on third party auxiliary transmission.

For example, when multiple users travel by a same means of transportation, the users are close to each other and hope to establish a temporary network to play a game and exchange digital entertainment resources and so on. A security level requirement is low and a data quantity requirement is large, therefore the multiple users may establish and maintain a temporary network without third party auxiliary transmission. Information of a type field of the application module indicates a networking mode not based on the third party auxiliary transmission.

Figure 6:
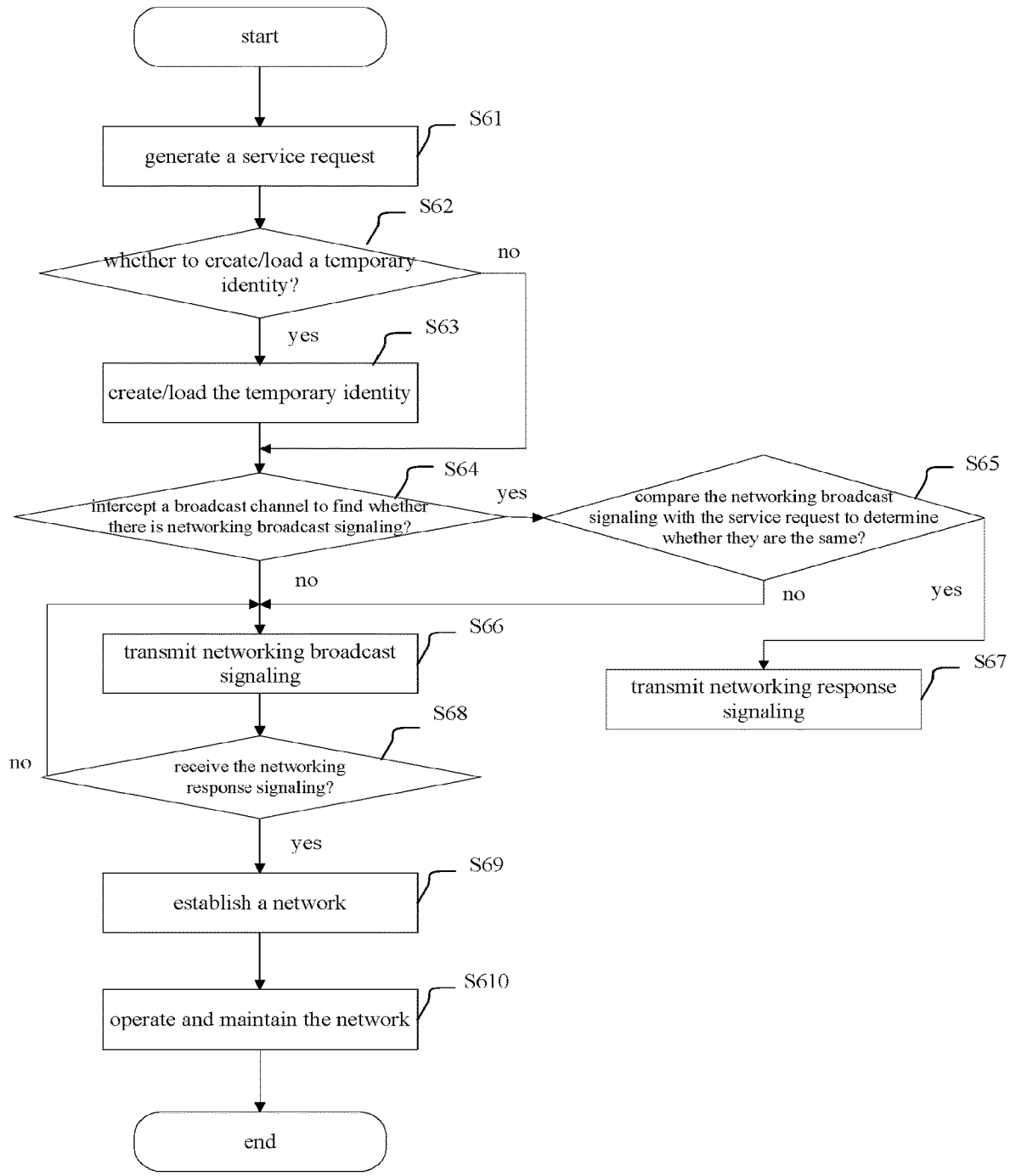
FIG. 6 shows an example of a networking mode which is not based on third party auxiliary transmission.

As shown in FIG. 6, firstly, in step S61, the user equipment 100 generates a corresponding service request. The service request includes but not limited to preference information and position information of a user. The preference information of the user includes an application name for example, and the position information of the user includes a current position, a destination and a wheel path and so on for example.

Then, in step S62, the user equipment 100 prompts whether to establish or load a temporary identity. This step is optional. If yes, establishment or loading is performed in step S63. If a main identity is wanted to be used, the main identity is loaded. If an existing temporary identity is wanted to be used, the existing temporary identity is loaded. If a new temporary identity is wanted to be used or a temporary identity is wanted in a case that there is no temporary identity previously, the temporary identity is created. If no is selected in step S62, step S63 is skipped.

Subsequently, in step S64, the user device 100 intercepts, transmits and responds to networking broadcast signaling. Specifically, the user equipment 100 intercepts whether there is networking broadcast signaling on a broadcast channel preset in a system. If no networking broadcast signaling is found, in step S66, the user equipment 100 transmits its own networking broadcast signaling on the broadcast channel. The networking broadcast signaling includes a service request from the user. If the user equipment 100 finds networking broadcast signaling, in step S65, the user equipment 100 compares a service request in the found networking broadcast signaling with its service request to determine whether the two service requests are the same. If the two service requests are the same, in step S67, the user equipment 100 transmits networking response signaling. If the two service requests are different, the user equipment 100 transmits its own networking broadcast signaling. Before receiving networking response signaling from other user equipments 100, the user equipment 100 performs steps of intercepting, transmitting and responding to the networking broadcast signaling on the broadcast channel periodically. After receiving the networking response signaling from other user equipments 100, in step S69, the user equipment 100 establishes a network as follows.

Next, the user equipment 100 establishes a network. The user equipment 100 transmitting the networking broadcast signaling performs a task of establishing a network, which is referred to as a main user. The user equipment 100 transmitting networking response signaling is referred to as a secondary user. The main user randomly selects a frequency band to establish a data link and notifies the secondary user via network information signaling, and both the main user and the secondary user establish a data link on a new frequency band. If the main user does not exist in an existing temporary network, the main user and the secondary user establish a new temporary network. If the main user exists in an existing temporary network, the main user adds the secondary user to the existing temporary network. In this case, the secondary user may be connected to the main user, the secondary user may be connected to a secondary user being closest to the secondary user physically in the existing temporary network, or the secondary user may be connected to a secondary user with the strongest reception signal in the existing temporary network. The connection relationship between nodes in the network is designed flexibly by those skilled in the art.

Then, in step S610, the main user (the user equipment 100) operates and maintains the network. After the network is established, any two users (user equipments 100) in the network should be connected directly or indirectly, therefore the two users may communicate with each other to interact information required by the application, for example playing a game. The main user (the user equipment 100) continues to transmit or intercept networking broadcast signaling on the broadcast channel periodically. Operation and maintenance of the temporary network follow the general network operation and maintenance rules. For example, the main user may be changed. Rules for change may be based on fairness and/or robustness. Fairness may indicate selecting randomly for example, and robustness may indicate that change of the main user can not influence connectivity of the temporary network. In addition, in order to ensure normal use of the network, it is stipulated that the main user has to specify a new main user and does not damage connectivity of the temporary network before leaving the network, and the secondary user has to ensure that leaving of the secondary user does not influence the connectivity of the temporary network before leaving the network. It needs to notify all users of change and leaving of the main user, and it needs to notify the main user of leaving of the secondary user.

(2) A networking mode based on the third party auxiliary transmission.

For example, a user of the user equipment 100 has an accident during driving and needs roadside assistance.

Figure 7:
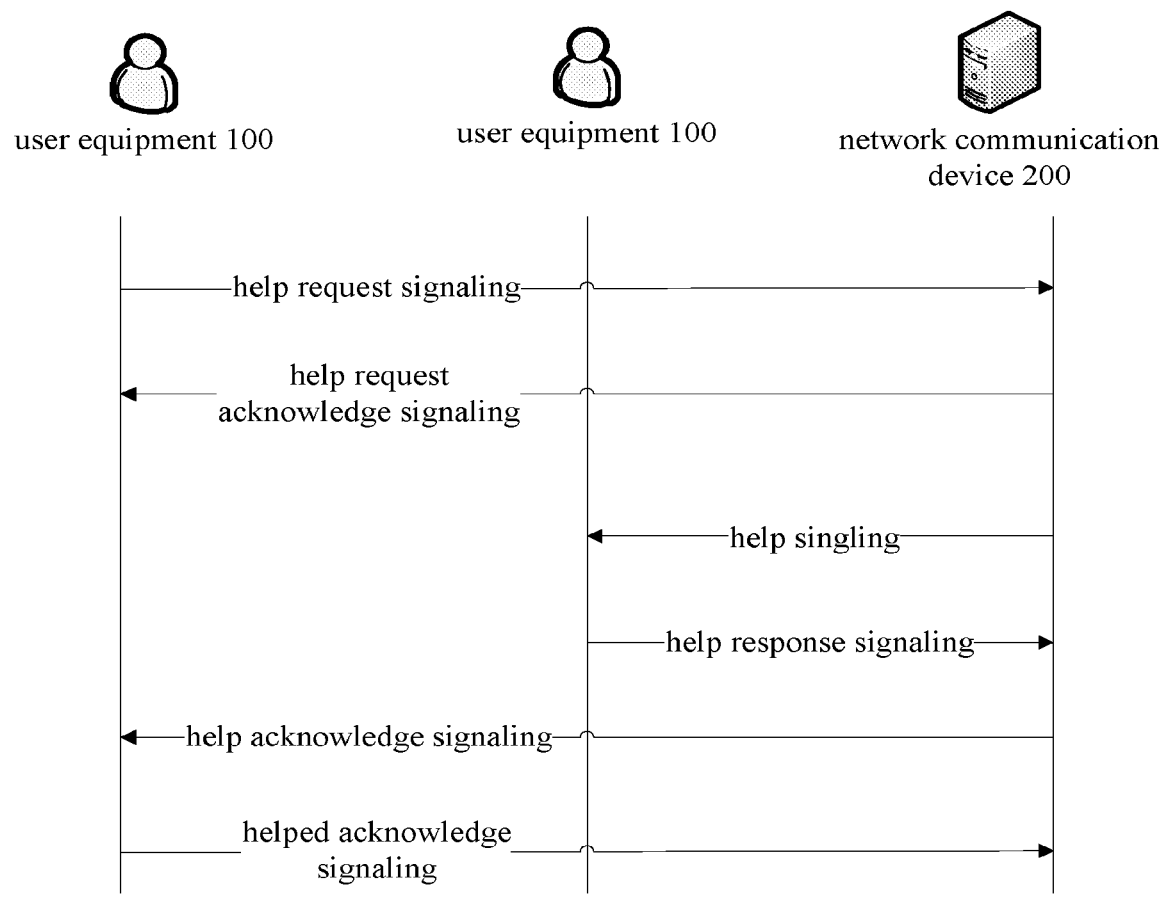
FIG. 7 shows an example of a networking mode which is based on third party auxiliary transmission.

As shown in FIG. 7, first, the user equipment 100 generates a corresponding service request. The request includes but not limited to a help content and a help position of the user and so on.

Then, the user equipment 100 transmits help request signaling including the service request to the network communication device 200.

After transmitting the help request signaling, the user equipment 100 intercepts a response from the network communication device 200. If no response from the network communication device 200 is received within a predetermined period of time, the user equipment 100 broadcasts the help request signaling and intercepts a response.

In another aspect, the network communication device 200 receives the help request signaling and transmits help request acknowledge signaling as the response.

After transmitting the help request acknowledge signaling, the network communication device 200 parses the received help request signaling, packs authentication information and the help content of a help seeker into help signaling and broadcasts near the help position. Alternatively, after transmitting the help request acknowledge signaling, the network communication device 200 transmits the help request signaling directly to the user equipment 100 which provides driving directions to the network communication device 200 previously and will reach a position near the help position within an effective period of time.

In this case, if another user equipment 100 receives the help signaling and likes to provide the required service, the another user equipment 100 feeds back help response signaling. The help response signaling includes but not limited to help acknowledge and its authentication information. Then, the another user equipment 100 (a helper) starts to intercept. If the helper receives help signaling from the network communication device 200, the helper transmits help response signaling to the network communication device 200, and the network communication device 200 forwards the help response signaling to the help seeker. If the helper receives the help signaling from broadcast contents transmitted from the help seeker, the helper broadcasts the received help signaling, and the help seeker directly obtain the help acknowledge signaling at an interception phase.

Then, if the help seeker receives the help acknowledge signaling from the network communication device 200 and likes to accept the help from the helper, the help seeker transmits helped acknowledge signaling to the network communication device 200. The network communication device 200 establishes a communication link between the help seeker and the helper and notifies the two parties so that the two parties may communicate with each other to negotiate providing help. If the help seeker receives the help acknowledge signaling directly from the helper and likes to accept the help from the helper, the help seeker transmits a communication connection request to the helper, and then the two parties may communicate with each other to negotiate providing help.

The above examples are only examples of specific applications, which do not limit the present disclosure.

Further, in addition to classifying the networking modes according to the security requirement and the data quantity requirement described above, the networking modes may be classified according to whether the application module is free or paid. For example, a free application module corresponds to a networking mode in which communication data between user equipments is not based on the third party auxiliary transmission, and the paid application module corresponds to a networking mode in which communication data between user equipments is based on the third party auxiliary transmission. Since the networking mode based on the third party auxiliary transmission has a higher networking success rate but needs to consume server computation resources and network resources, it is appropriate to apply the networking mode to the paid application module.

In addition, it should be noted that, various components and units in the device may be configured by software, firmware, hardware or a combination thereof. Specific means or ways usable in the configuration are well known for those skilled in the art, which are not described in detail here. In a case of implementing by software or firmware, programs constituting the software are installed to a computer with a dedicated hardware structure (for example a general-purpose computer 500 shown in FIG. 8) from the storage medium or network. The computer can perform various types of functions when installing with various types of programs.

Figure 8:
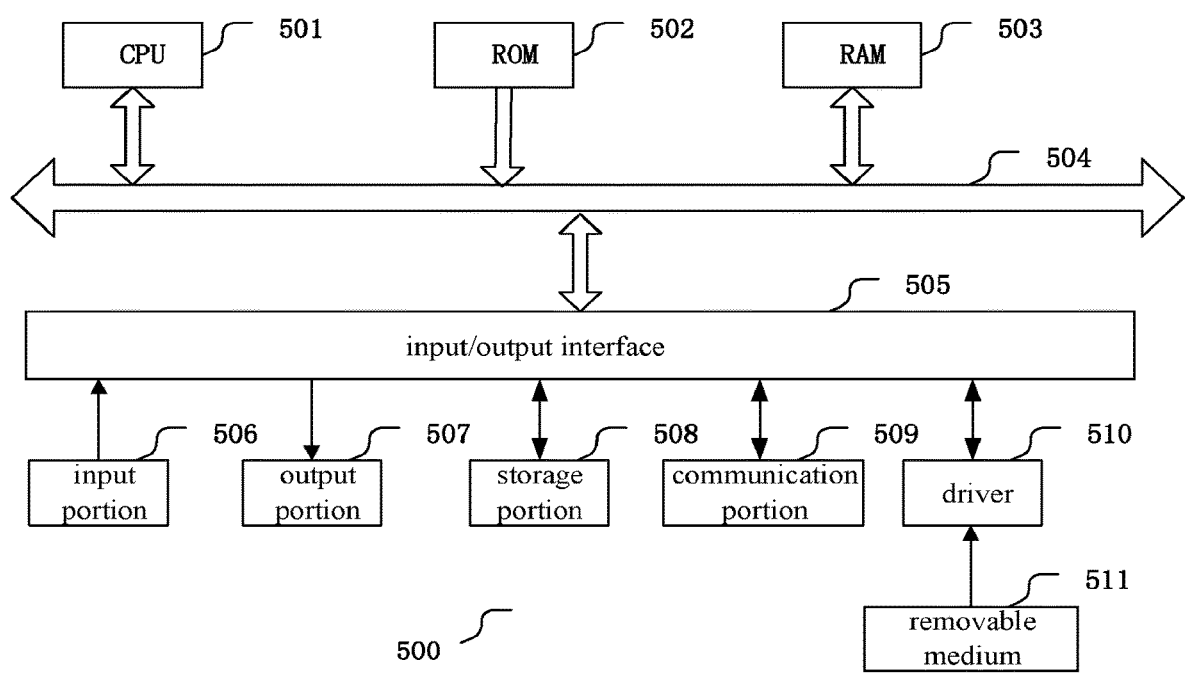
FIG. 8 shows a schematic block diagram of a computer for implementing the method and the device according to the embodiment of the present disclosure.

FIG. 8 shows a schematic block diagram of a computer for implementing the method and the device according to the embodiment of the present disclosure.

In FIG. 8, a central processing unit (CPU) 501 performs various types of processing according to programs stored in a read only memory (ROM) 502 or programs loaded from a storage portion 508 to a random access memory (RAM) 503. Data required when the CPU 501 performs various types of processing is stored in the RAM 503 as needed. The CPU 501, the ROM 502 and the RAM 503 are connected to each other via a bus 504. An input/output interface 505 is also connected to the bus 504.

The following components are connected to the input/output interface 505: an input portion 506 (including a keyboard, and a mouse and so on), an output portion 507 (including a display, for example a cathode ray tube (CRT) and a liquid crystal display (LCD), and a loudspeaker), a storage portion 508 (including a hard disk and so on), and a communication portion 509 (including a network interface card for example a LAN card, and a modem). The communication portion 509 performs communication processing via a network for example the Internet. A driver 510 may also be connected to the input/output interface 505 as needed. A removable medium 511 for example a magnetic disk, an optical disk, a magnetic-optical disk and a semiconductor memory may be installed on the driver 510 as needed, so that computer programs read from the removable medium 511 are installed on the storage portion 508 as needed.

In a case of performing the series of processing described above by software, programs constituting the software are installed from the network for example the Internet or the storage medium for example the removable medium 511.

Those skilled in the art should understand that the storage medium is not limited to the removable medium 511 shown in FIG. 8 which stores programs and is distributed separately from the device to provide the programs to the user. Examples of the removable medium 511 include: a magnetic disk (including a floppy disk (registered trademark), an optical disk (including a compact disk (CD)-ROM) and a digital versatile disk (DVD), a magnetic-optical disk (including a mini disk (MD) (trademark)), and a semiconductor memory. Alternatively, the storage medium may be a hard disk included in the ROM 502 and the storage portion 508 which stores programs. The storage medium and the device including thereof together are distributed to the user.

A program product storing machine readable instruction codes is further provided according to the present disclosure. When read and executed by a machine, the instruction codes cause the machine to perform the method according to the embodiment of the present disclosure.

Accordingly, a storage medium for carrying the program product storing the machine readable instruction codes is also included in the present disclosure. The storage medium includes but not limited to a floppy disk, an optical disk, a magnetic-optical disk, a storage card and a memory stick.

In the description of specific embodiments of the present disclosure above, features described and/or illustrated for one embodiment may be used in one or more other embodiments in the same or similar manner, combined with features in other embodiments, or substitute for features in other embodiments.

It should be noted that, terms "including/comprising" used herein refer to existing of features, elements, steps or components, but existing or adding of one or more other features, elements, steps or components is not excluded.

In addition, the method according to the present disclosure is not limited to be performed in a time order described in the description, and may be performed according to other time orders, in parallel or independently. Therefore, the order in which the method described in the description is performed does not limit the technical scope of the present disclosure.

Although the present disclosure is disclosed by the description of specific embodiments of the present disclosure above, it should be understood that all the embodiments and examples described above are only schematic and are not intended to limit. For those skilled in the art, various changes, improvements or equivalents may be designed for the present disclosure within the spirit and scope of the appended claims. Therefore, the changes, improvements or equivalents should be regarded as falling within the protection scope of the present disclosure.

The invention claimed is:

1. A user equipment in a communication system, comprising:
circuitry configured to
acquire type information of at least one application module of two or more application modules corresponding to an on-line game application in the user equipment, the two or more application modules including a first application module and a second application module as a component of the on-line game application which can be performed separately in response to a user request, the first application module being payment of the on-line game application and the second application module being transmission of large quantity of game content data of the on-line game application, the type information of the at least one application module being analyzed and set based on a security requirement and an interact data quantity requirement on a basis of application module, by a network communication device; and establish a communication network with another user equipment by using a first networking mode or a second networking mode of transmission of data based on the acquired type information of the at least one application module, the first networking mode indicating transmission of data supported by a third party communication and the second networking mode indicating transmission of data without support by the third party communication, wherein the communication network with another user equipment is established by the first networking mode, when performing the first application module of the on-line game application, and wherein the communication network with another user equipment is established by the second networking mode, when performing the second application module of the on-line game application.

2. The user equipment according to claim 1, wherein the circuitry is further configured to:

register with a service system of the at least one application module and obtain a unique main identity of a user from the service system.

3. The user equipment according to claim 2, wherein the circuitry is further configured to:

submit information containing a user identity to the service system of the at least one application module to obtain a unique main identity having an identity authentication identification.

4. The user equipment according to claim 1, wherein the circuitry is further configured to submit information containing a user identity to the service system of the at least one application module to obtain a unique main identity having an identity authentication identification, so as to perform the first application module with a high security requirement by the first networking mode.

5. The user equipment according to claim 1, wherein the circuitry is further configured to generate one or more user temporary identities, to perform the second application module with a low security requirement by the second networking mode.

6. The user equipment according to claim 1, wherein, in the second networking mode, the circuitry is further configured to:

generate a service request comprising an application name of the application and position information of the user equipment;

on one or a group of preset channels, intercept networking broadcast signaling;

in a case where no networking broadcast signaling is intercepted, select an idle channel to transmit networking broadcast signaling comprising the service request;

in a case where networking broadcast signaling is intercepted, compare a service request comprised in the intercepted networking broadcast signaling with the generated service request;

in a case where the comparison indicates that the service requests are consistent, transmit networking response signaling;

in a case where the comparison indicates that the service requests are inconsistent, select an idle channel to transmit networking broadcast signaling comprising the service request;

continue to intercept, in the absence of networking broadcast signaling comprising a consistent service request and in the absence of an idle channel, until one of the networking broadcast signaling and the idle channel is found.

7. The user equipment according to claim 1, wherein, in the first networking mode, the circuitry is further configured to:

generate a service request comprising position information of the user equipment;

transmit request signaling comprising the service request to the third party;

receive acknowledge signaling of the third party on the request signaling; and communicate, via the third party, with another user equipment transmitting the acknowledge signaling.

8. The user equipment according to claim 1, wherein the first networking mode is data communication performed between mobile stations via a base station, and the second networking mode is Device to Device (D2D) communication between mobile stations in Long Term Evolution Advanced (LTE-A) standard.

9. The user equipment according to claim 1, wherein the first networking mode is cellular communication supported by a base station.

10. A network communication device in a communication system, comprising:

circuitry configured to analyze two or more application modules corresponding to an on-line game application, so as to perform classification in accordance with networking modes of transmission of data adapted to each of the application modules, the two or more application modules including a first application module and a second application module as a component of the application which can be performed separately in response to a user request, the first application module being payment of the on-line game application and the second application module being transmission of large quantity of game content data of the on-line game application, the networking modes including a first networking mode indicating transmission of data supported by a third party communication and a second networking mode indicating transmission of data without support by the third party communication; and add a type field to each of the application modules, the type field containing a type information of the respective application module representative of a classification result based on a security requirement and an interact data quantity requirement for the respective application module, on a basis of application module, wherein the type field for each of the application modules is used by a user equipment to establish a communication network with another user equipment, wherein the communication network with another user equipment is established by the first networking mode, when performing the first application module of the on-line game application, and wherein the communication network with another user equipment is established by the second networking mode, when performing the second application module of the on-line game application.

11. The network communication device according to claim 10, wherein the circuitry is further configured to analyze the security requirement of the application module, and determine whether the first or the second networking mode adapted to the application module based on the security requirement, so as to perform the classification.

12. The network communication device according to claim 11, the circuitry is further configured to authenticate a user based on user identity information, wherein the network communication device is configured to provide the first application module with a high security requirement to the authenticated user.

13. The network communication device according to claim 10, wherein the circuitry is further configured to analyze the interactive data quantity requirement of the application module, and determine whether the first or the second networking mode adapted to the application module based on the interactive data quantity requirement, so as to perform the classification.

14. The network communication device according to claim 10, wherein the circuitry, in the first networking mode is further configured to:
receive request signaling comprising a service request containing position information of a first user equipment which is transmitted by the first user equipment;
broadcast signaling comprising the service request;
receive acknowledge signaling of a second user equipment on the broadcast signaling;
transmit the acknowledge signaling to the first user equipment; and
coordinate communication between the first user equipment and the second user equipment.

15. A wireless communication method, comprising:
acquiring, type information of at least one application module of two or more application modules corresponding to an on-line game application in the user equipment, the two or more application modules including a first application module and a second application module as a component of the on-line game application which can be performed separately in response to a user request, the first application module being payment of the on-line game application and the second application module being transmission of large quantity of game content data of the on-line game application, the type information of the at least one application module being analyzed and set based on a security requirement and an interact data quantity requirement on a basis of application module, by a network communication device; and
establishing a communication network with another user equipment by using a first networking mode or a second networking mode of transmission of data based on the acquired type information of the at least one application module, the first networking mode indicating transmission of data supported by a third party communication and the second networking mode indicating transmission of data without support by the third party communication,
wherein the communication network with another user equipment is established by the first networking mode, when performing the first application module of the on-line game application, and
wherein the communication network with another user equipment is established by the second networking mode, when performing the second application module of the on-line game application.

\* \* \* \* \*